United States Patent [19]

Baker

[11] Patent Number: 5,506,914
[45] Date of Patent: Apr. 9, 1996

[54] AUTOMATED TRUSS INSPECTION SYSTEM

[76] Inventor: James F. Baker, 951 N. Union, Fremont, Nebr. 68025

[21] Appl. No.: 317,166

[22] Filed: Oct. 3, 1994

[51] Int. Cl.⁶ .................................................. G06K 9/00
[52] U.S. Cl. ........................... 382/141; 382/286; 348/86; 348/125; 356/237
[58] Field of Search ..................... 382/141, 152, 382/286, 312, 325; 348/86, 91, 125; 356/237

[56] References Cited

U.S. PATENT DOCUMENTS

| | | | |
|---|---|---|---|
| 3,417,231 | 12/1968 | Stites et al. | 235/61.11 |
| 3,857,020 | 12/1974 | Higginbotham et al. | 235/61.11 |
| 3,961,164 | 6/1976 | Reed et al. | 235/61.12 |
| 4,511,793 | 4/1985 | Racanelli | 235/375 |
| 4,514,899 | 5/1985 | Burger | 29/721 |
| 4,523,088 | 6/1985 | Utsch et al. | 235/487 |
| 4,588,880 | 5/1986 | Hesser | 235/376 |
| 4,628,737 | 12/1986 | Charles et al. | 73/624 |
| 4,837,426 | 6/1989 | Pease et al. | 235/440 |
| 5,098,642 | 3/1992 | Gaubatz | 376/245 |
| 5,211,108 | 5/1993 | Gore et al. | 100/48 |

*Primary Examiner*—Leo Boudreau
*Assistant Examiner*—David R. Anderson
*Attorney, Agent, or Firm*—John A. Beehner

[57] ABSTRACT

An automated truss inspection system for inspecting metal plate connected trusses includes a base structure having a truss feed end and a truss exit end, a truss presence detector and a bar code scanner. A truss structure sensor array and at least one metal sensor array are situated intermediate the truss feed end and truss exit end for detection of truss structure and absence thereof and detection of the presence/absence of metal, respectively. Finally, a rotary pulse generator is included for determining truss speed and distance traveled. All of the scanning and measuring devices are operatively connected to an analyzing and comparing device such as a computer which analyzes data received from those devices and constructs an X-Y coordinate outline image of the truss under inspection, the image then being compared to the ideal model of the truss under inspection to determine acceptability of the truss.

12 Claims, 7 Drawing Sheets

AUTOMATED TRUSS INSPECTION SYSTEM

BACKGROUND OF THE INVENTION

1. Technical Field

This invention relates to truss inspection systems and, more particularly, to an automated truss inspection system for inspecting metal plate connected wood trusses which includes a truss presence detector, a bar code scanner, a truss structure sensor array, a metal sensor array, a rotary pulse generator and a computer to analyze the data received from the detectors, construct an X-Y coordinate outline image of the truss under inspection and compare the image to the ideal model of the truss under inspection to determine the acceptability according to codes and practices of the industry of the truss under inspection.

2. Description of the Prior Art

The popularity of prefabricated components has steadily increased from the time such methods of construction were introduced. In componentized housing, all of the various structural elements of the house (walls, floor trusses and roof trusses, etc. . . . ) are constructed at a remote factory and then shipped to the location where the house is being built. At the location for the house, the prefabricated components are assembled and connected to one another to form the completed structure.

Among the more commonly produced prefabricated components are wood trusses, which may be used to form either or both of the roof and floor support structures in the componentized structure. Wood trusses are commonly constructed by arranging the various elements of the truss, including chords and web members, in the desired shape in a set of jigs in an assembly line process. The truss elements are then connected to one another by metal nailer plates which are pressed into the wood at each intersection of the various elements and ejected from the jig and pressed by a finishing roller. In this manner, the truss structure is formed.

Because of competitive forces, it is imperative to automate the process for such trusses to minimize manufacturing costs.

At present in non-automated truss construction, the lumber is laid out by hand in a set of jigs on the conveyor rollers and the studded metal plates are partially inserted into the wood at the intersection of the various elements. The entire structure is ejected from the jig and then passed through "finish rollers" which press the metal nailer plates into the wood by sandwiching the truss between two large metal rollers. However, it is still necessary to provide an inspector to inspect the wood truss after it passes through the finish rollers. The inspector makes sure that the wood truss is of the proper shape and that all of the metal plates are in place at the intersections of the truss elements. There are two of the many code-pertaining details that the inspector must check. It is important to realize that the inspector is only human, however, and that he or she may not catch each and every imperfection in the truss during the limited time provided for inspection. Specific problems encountered in the inspection of trusses are missing studded metal plates, missing structural members, the truss shape being misaligned, etc. Obviously, it is relatively simple to catch missing structural members, but as the studded metal plates are on both sides of the truss, an inspector may not catch a missing metal plate on the underside of the truss, particularly in new manufacturing systems which never expose one side of the truss prior to stacking, banding and preparation for shipment. Even harder to catch is the truss structure being misaligned, as even a small variance from preferred dimensions can render the truss unsuitable for construction purposes. Therefore, there is a need for an automated truss inspection system which is capable of performing the same function as an inspector yet does so to a greater degree of accuracy.

Therefore, an object of the present invention is to provide an automated truss inspection system.

Another object of the present invention is to provide an automated truss inspection system which includes a truss presence detector, a bar code scanner, a truss structure sensor array, a metal sensor array, a rotary pulse generator and a computer to analyze the data received from the detectors and sensors, construct an X-Y coordinate outline image of the truss under inspection and compare the image to the ideal model of the truss under inspection to determine the acceptability of the truss under inspection per building codes and industry practices.

Another object of the present invention is to provide an automated truss inspection system which can be mounted adjacent the finish rollers of the truss assembly line to provide a final inspection for trusses coming off the assembly line.

Another object of the present invention is to provide an automated truss inspection system which will compare the truss under inspection with the ideal model of the truss under inspection to determine any dimensional or positional irregularities, etc., and should irregularities appear, stop the conveyor/press and notify the operator of the device.

Another object of the present invention is to provide an automated truss inspection system which operates quickly and independently of any human overseer yet functions with a high degree of accuracy.

Another object of the present invention is to provide an automated truss inspection system which can be adapted for use with present manufacturing assembly line systems.

Finally, an object of the present invention is to provide an automated truss inspection system which is safe in use and quick and efficient in operation.

SUMMARY OF THE INVENTION

The automated truss inspection system for inspecting metal plate-connected wood trusses of the present invention includes a base structure having a truss feed end and a truss exit end. A truss presence detector is mounted on the base structure adjacent the truss feed end for detecting the presence of a truss and a bar code scanning device is likewise mounted on the base structure for scanning the truss to determine the model of truss being inspected. Mounted on the base structure intermediate the truss feed end and truss exit end is a truss structure sensor array for detection of truss structure and absence thereof and a metal sensor array for detection of the presence/absence of metal, specifically the metal nailer plates. Also, a distance measuring device is provided for measuring the rate of travel of the truss toward the truss exit end. In the case of a rotary pulse generator, it is preferably mounted on the finish roller in contact with one of the finish rollers. An analyzing and comparing device such as a computer is operatively connected to the truss presence detector, the bar code scanning device, the truss structure sensor array, the metal sensor array and the distance measuring device, each of which transmits data to the analyzing and comparing device. The analyzing and comparing device analyzes data from the truss presence detector, the bar code scanning device, the truss structure sensor array, the metal sensor array and the distance measuring device to construct an X-Y coordinate outline image of the truss under inspection, the image then being compared to the ideal model of the truss under inspection to determine acceptability of the truss under inspection per codes and practices.

The present invention thus provides an automated truss inspection system which is superior to the antiquated visual inspection practices found in the prior art. The present invention is specifically designed to construct an outline image of the truss under inspection to verify that the truss is of the correct size and shape, includes all structural elements which should be present and meets other mandatory design criteria. Furthermore, the present invention detects the presence/absence of metal, particularly the presence or absence of the nailer plates which join the structural elements of the truss to one another. If it is determined that the truss is defective for any reason, the present invention halts the conveyor system until the problem is corrected. With such an automated system, the speed and efficiency of the assembly line may be greatly increased. Therefore, it is seen that the present invention provides a substantial improvement over the antiquated visual inspection practices heretofore used.

DESCRIPTION OF THE PREFERRED EMBODIMENT

Figure 7:
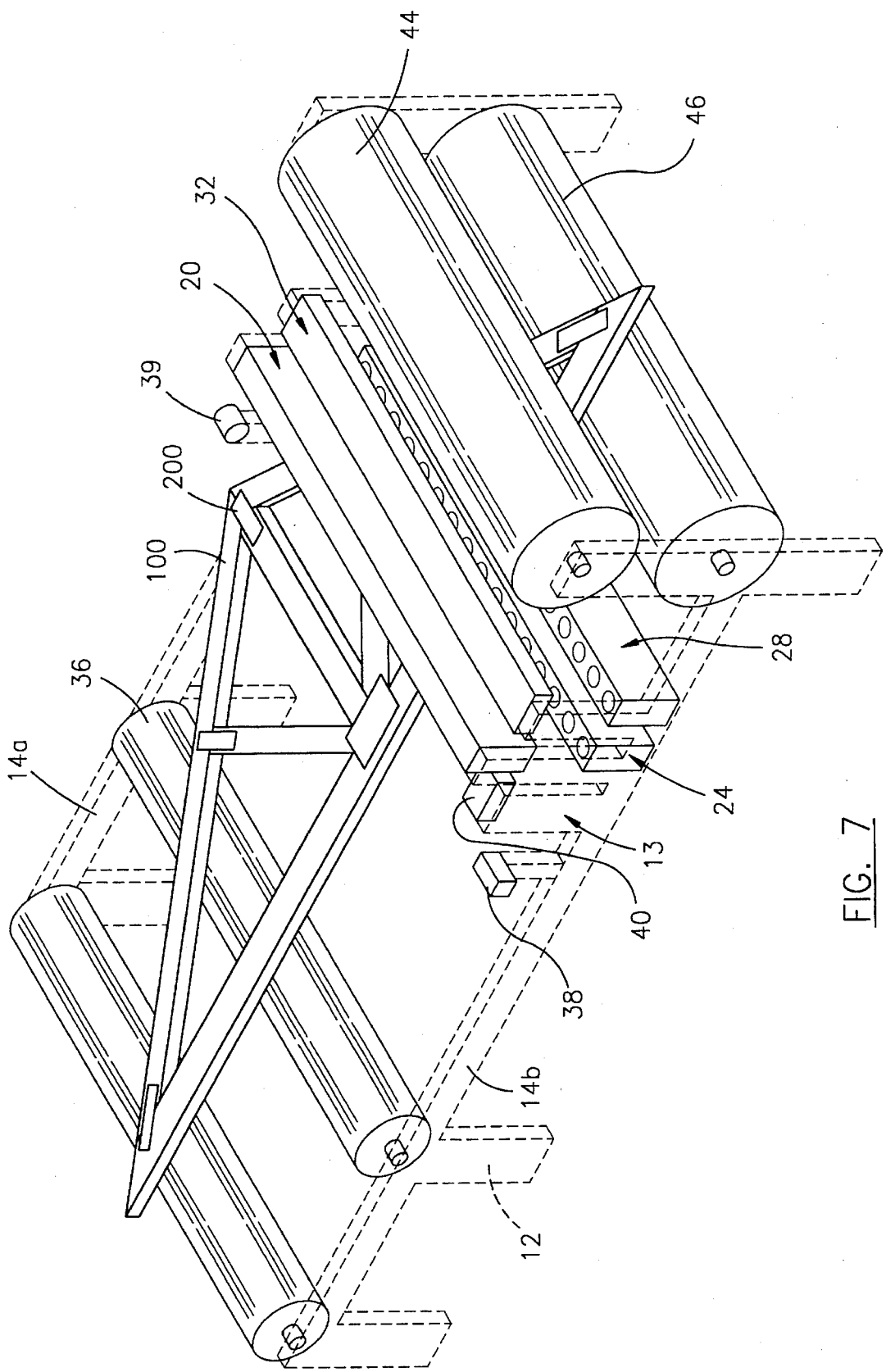
FIG. 7 is a perspective view of the present invention showing the organization of the various elements, but for the rotary pulse generator shown in FIG. 1.

The automated truss inspection system 10 of the present invention is shown in its preferred embodiment in FIGS. 1–6 as including a sensor support structure 12 which preferably consists of a plurality of vertical support bars 13 (FIG. 7) mounted on left and right conveyor roller supports 14a and 4b. The various sensors are mounted on the vertical support bars 13 as shown in FIG. 7. Mounted on vertical support bars 13 are upper and lower sensor groups 16 and 18. The upper sensor group 16 includes an array 20 of metal detecting proximity switches 22 and an array 28 of photosensors 30.

Metal detecting proximity switches 22 detect the presence/absence of metal nailer plates 200. It is preferred that the metal detecting proximity switches 22 be vertically aligned to sense metal directly beneath each of the switches 22 and that the switches 22 be arranged in a line extending perpendicular to the direction of travel of the wood truss 100 thus forming array 20. While the exact number of proximity switches 22 is not critical to the present invention, it is critical that there be a sufficient number of proximity switches 22 to obtain detailed resolution of the nailer plates 200 on the wood truss 100. For this reason, it is preferred that there be at least one metal detecting proximity switch 22 per inch along the array 20. In a preferred embodiment, the width of the array 20 should be between four and fourteen feet in order to accommodate conventional sized wood trusses 100, although it is preferred that the array 20 extend substantially the entire distance between roller supports 14a and 14b.

Similar to that described in connection with upper sensor group 16, lower sensor group 18 includes an array 24 of metal detecting proximity switches 26 and an array 28 of photosensors 30. Each of the switches 26 is focused upwards to detect metal nailer plates 200 on the underside of the truss 100 passing thereabove. It is preferred that the upper array 20 and the lower array 24 be substantially similar except for the proximity switches 22 in the upper array 20 aiming downwards and proximity switches 26 in the lower array 24 aiming upwards. In this manner, metal nailer plates 200 on both the upper and lower surfaces of the wood truss 100 may be detected.

As shown in the preferred embodiment, lower sensor group further includes an array 28 of photosensors 30, array 28 being aligned generally parallel with array 24 such that array 28 is generally perpendicular to the direction of travel of wood truss 100. The photosensors 30 operate to detect the presence/absence of the typically wood members of the truss 100. It is preferred that the photosensors 30 be present in array 28 at a density of at least one photosensor 30 per inch, although use of a greater density of photosensors 30 is possible. The closer together the photosensors 30 are in array 28, the more accurate will be the data received from the photosensors 30 regarding location of truss elements using presently available technology.

Mounted in the upper group 16 directly above array 28 of photosensors 30 is an array 32 of reflectors 34 which cooperate with array 28 of photosensors 30 to reflect light into the photosensors 30 such that when the reflected light is interrupted by the presence of a truss element, the associated photosensor 30 may register the presence of the truss element thereabove.

In the preferred embodiment, the metal detecting proximity switches 22 and 26 may be of a commercially available type such as model number 11A-3015-BPKG manufacturers by Efector, Inc. of Exton, Pa., and the photosensors 30 may be of a commercially available type such as model number CP18LDND2 manufactured by Microswitch, a Honeywell division. Other types of metal detecting proximity switches and photosensors may be employed with the present invention which is not limited to the specific types of proximity switches and presence detectors described above.

Figure 1:
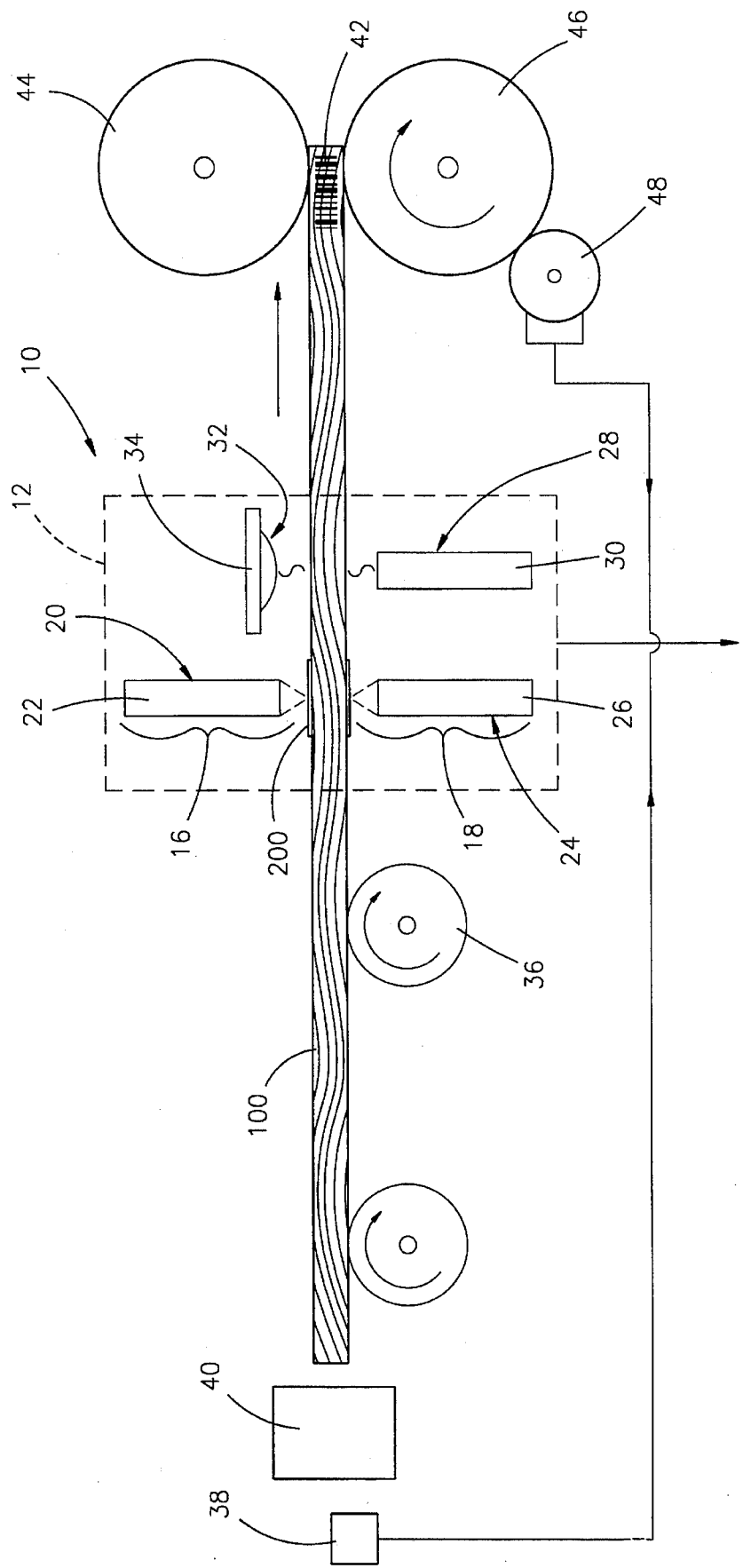
FIG. 1 is a diagrammatic side sectional view of the automated truss inspection system of the present invention.

As shown best in FIG. 1, sensor support structure 12 is mounted adjacent a set of conveyor rollers 36 on which wood truss 100 is positioned. The conveyor rollers 36 are preferably part of a truss assembly line (not shown) such as is commonly found in wood truss manufacturing facilities. The present invention is thus designed to be used with already existing truss manufacturing assembly lines, as well as installed with newly fabricated truss manufacturing assembly lines.

Mounted adjacent the sensor support structure 12 is a truss presence photosensor 38 (FIGS. 1, 2 and 7) and reflector 39 assembly which scans the area in front of the sensor support structure 12 approximately one inch above the conveyor rollers 36 to detect the presence of a wood truss 100. When a wood truss 100 is slid over the conveyor rollers 36 towards the sensor support structure 12, the light beam extending between the truss presence photosensor 38 and reflector 39 is blocked, thus signaling the presence of a truss 100. Of course, any truss presence detecting device may be used with the present invention, so long as the presence of a truss may be detected.

Mounted forwardly of the sensor support structure 12 is a bar code scanner 40, which is preferably a commercially available bar code scanner, which scans the oncoming wood truss 100 and reads the bar code label 42 on the truss 100 to determine the model of truss being inspected. Of course, the location and type of bar code scanner is not critical to the invention, so long as the bar code scanner 40 correctly identifies the model of truss being inspected.

Rearwards of the sensor support structure 12 are the finish rollers 44 and 46, which advance the truss along the conveyor rollers 36. Finish rollers 44 and 46 are used to firmly seat the various truss elements of the wood truss 100 by finally inserting each of the nailer plates 200 as the nailer plate contacts the finish rollers 44 and 46. The finish rollers 44 and 46 are important not only because they finally assemble the wood truss 100, but because the finish rollers 44 and 46 advance at a generally constant rate of speed. To register this generally constant rate of speed, the present invention utilizes a rotary pulse generator or encoder which frictionally engages the lower finish roller 46, as shown in FIG. 1. As finish roller 46 rotates, then, rotary pulse generator 48 is rotated in the opposite direction due to the frictional contact with finish drive roller 46. The speed of this rotation is then measured to determine the speed at which wood truss 100 is traveling on the conveyor rollers 36. It is preferred that the rotary pulse generator generate a count of at least 100 counts per inch of motion of the wood truss 100 to provide sufficient resolution for the computer system 50.

Figure 5:
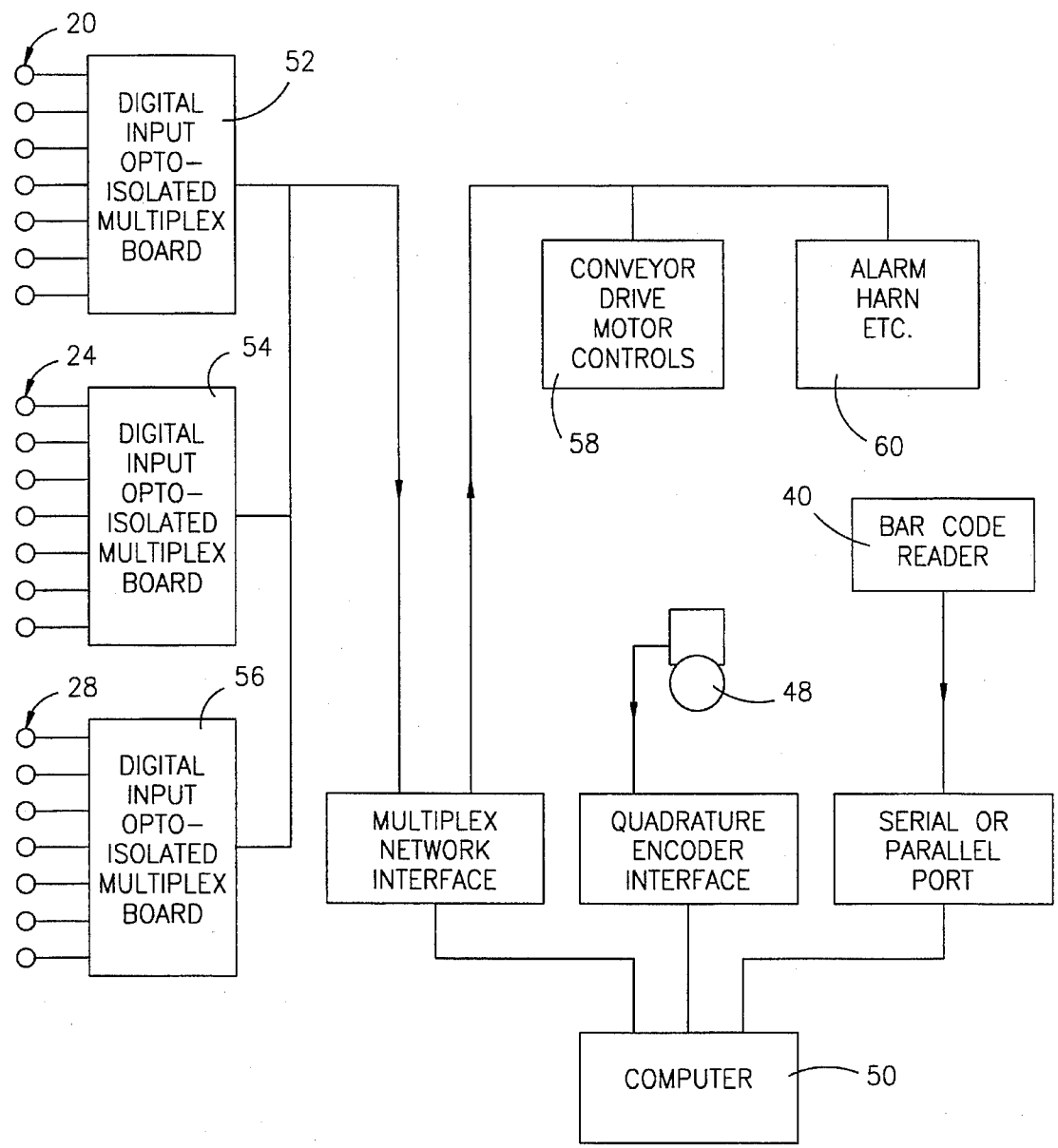
FIG. 5 is a flow diagram showing how the computer interfaces with the various data input devices.
Figure 6:
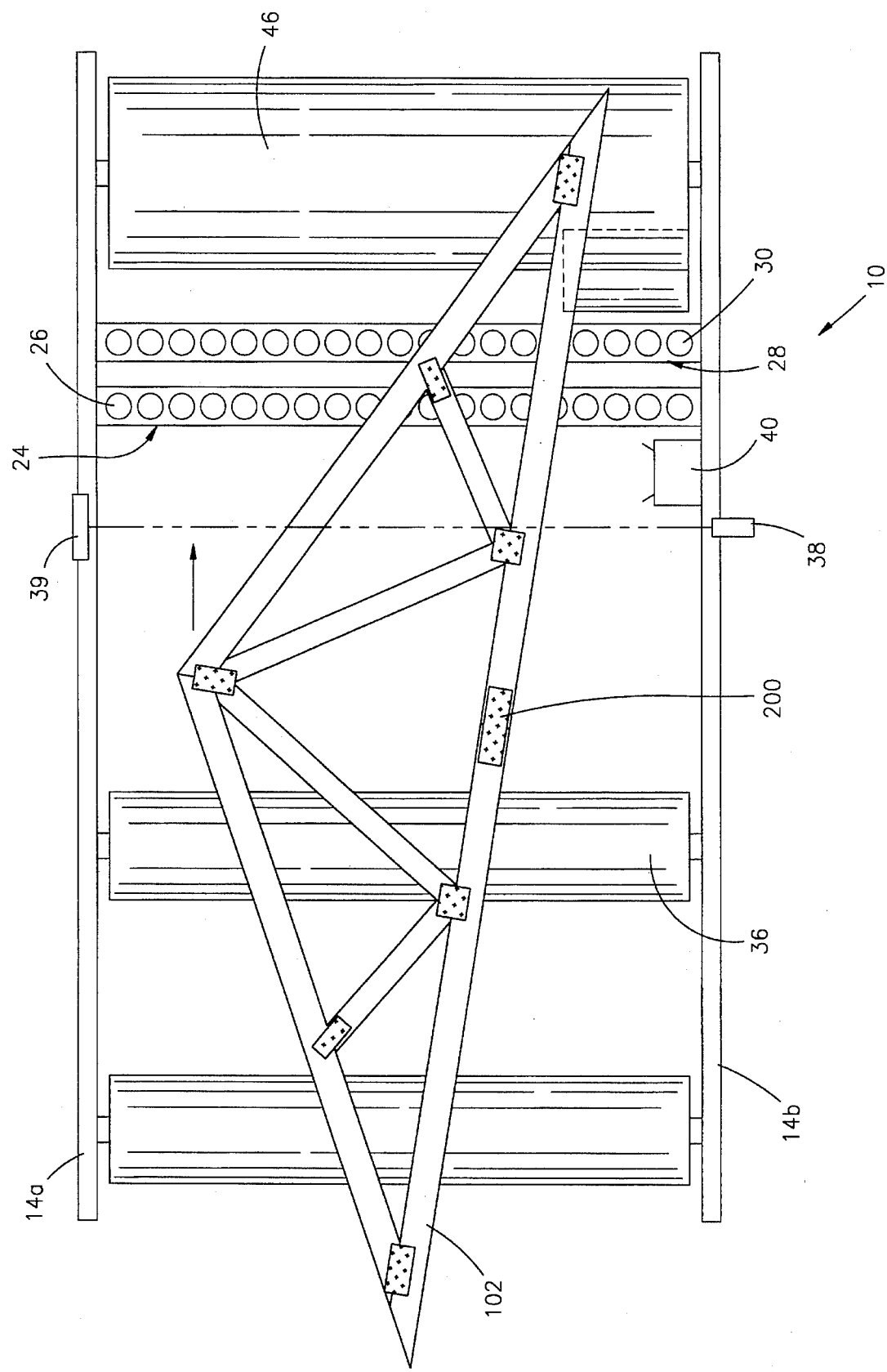
FIG. 6 is a top plan view of the present invention showing a different type of truss being scanned.

Each of the sensing devices described above is electrically connected to the computer system 50, which in the preferred embodiment may be a standard IBM compatible personal computer or the like. FIG. 5 shows a block diagram showing the connections between the various sensing devices and the computer. To the left side of FIG. 5, it is seen that each of the arrays 20, 24 and 28 are connected to digital input optoisolated multiplex boards 52, 54 and 56. Examining multiplex board 52, we see that array 20 of metal detecting proximity switches 22 is connected to multiplex board 52. Each of the proximity switches 22 is connected to a separate input on the multiplex board 52 such that the output of each proximity switch 22 can be individually sampled. As the metal detecting proximity switches 22 are binary devices (either ON or OFF), the multiplex board 52 transmits a different 16-bit block depending on which of the proximity switches 22 register the proximity of a metallic substance, such as a nailer plate 200. In this manner, based on the particular 16-bit block being sent to the computer from multiplex board 52, the computer 50 recognizes the location of the detected metal nailer plate.

Likewise, multiplex board 54 is connected to array 24 and multiplex board 56 is connected to array 28, each of which transmits a similar 16-bit block to the computer 50 when a wood truss 100 is being scanned. It is believed that 16-bit blocks of data should be sufficient to communicate the ON/OFF states of the various sensors 22, 26 and 30, although the data block size is not crucial to the present invention, and, in fact, it may be more efficient to assign each sensing unit 22, 26 and 30 a separate data bit, the resulting large data block being transferred to the computer 50 in 16-bit blocks to guarantee that each multiplex board 52, 54 and 56 will be sampled generally continuously.

As also shown on FIG. 5, the rotary pulse generator 48 and bar code scanner 40 each transmit data to the computer system 50 through the appropriate data interface. In this manner, the bar code of the truss under inspection may be accessed by the computer system 50 and the travel speed of the truss 100 may likewise be accessed by the computer system 50.

Figure 2:
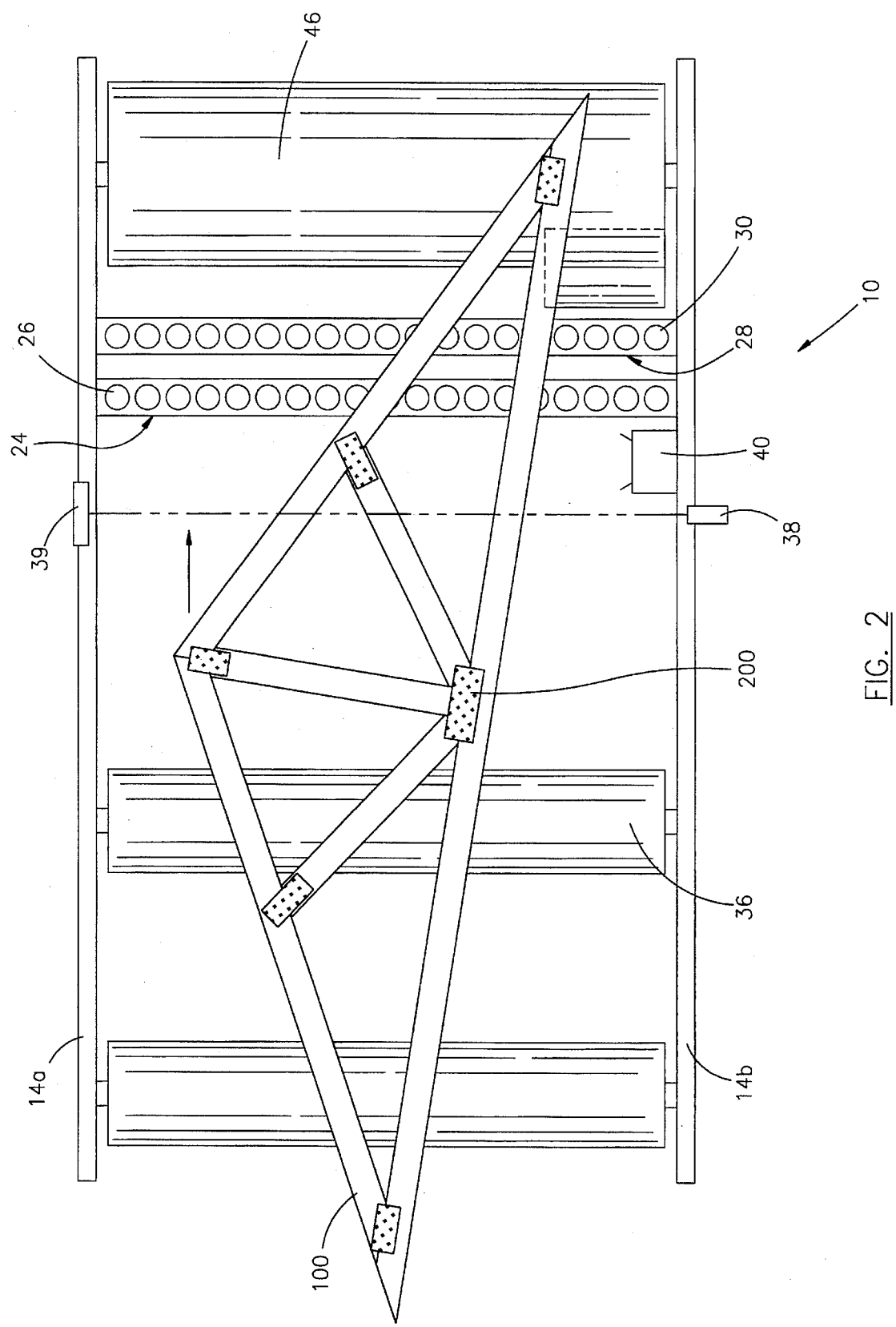
FIG. 2 is a top plan view of the present invention showing a metal plate-connected wood truss on the conveyor rollers.
Figure 3:
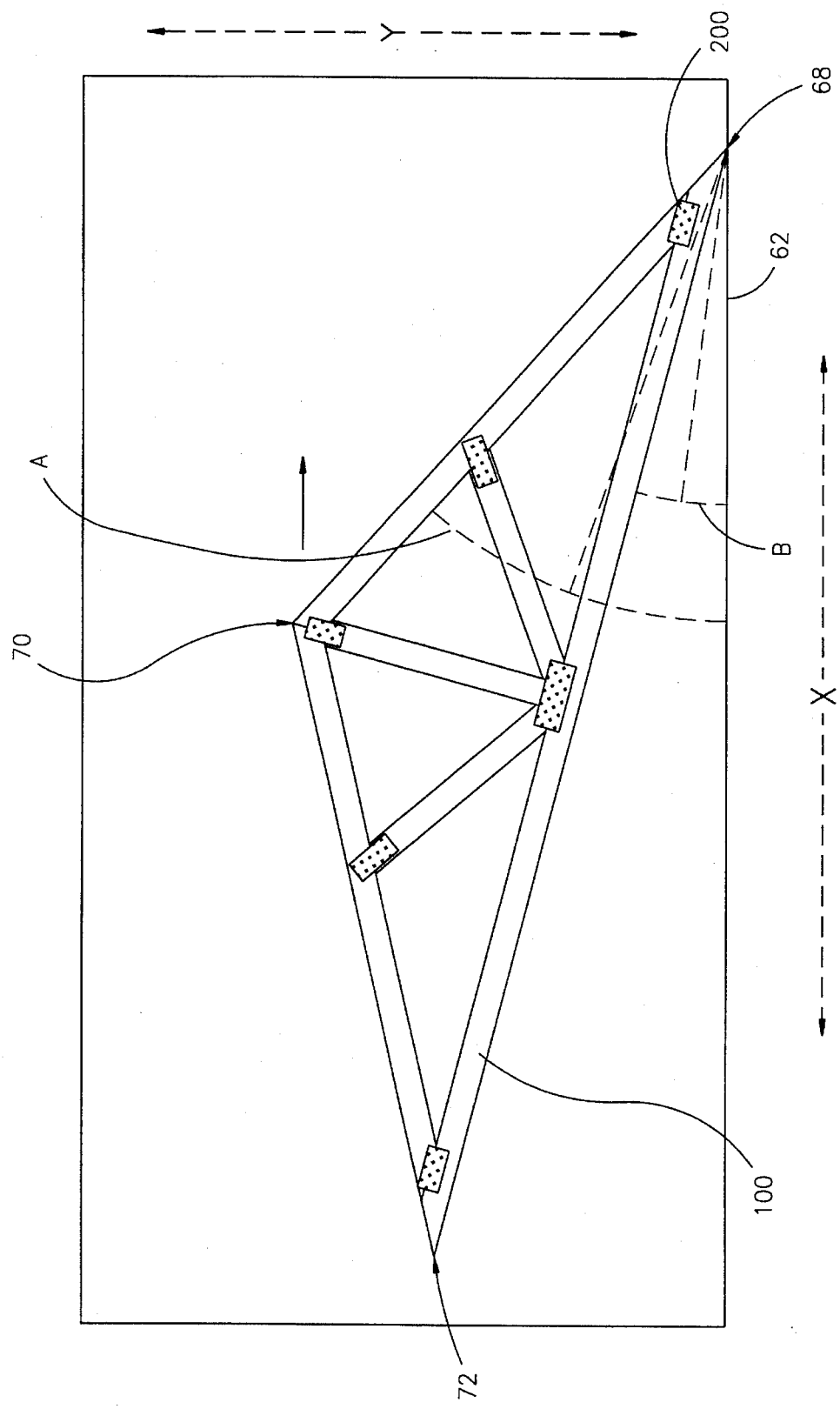
FIG. 3 is a top plan view of a wood truss scanned by the present invention showing the various angles and axes used to compute the dimensions of the wood frame.
Figure 4:
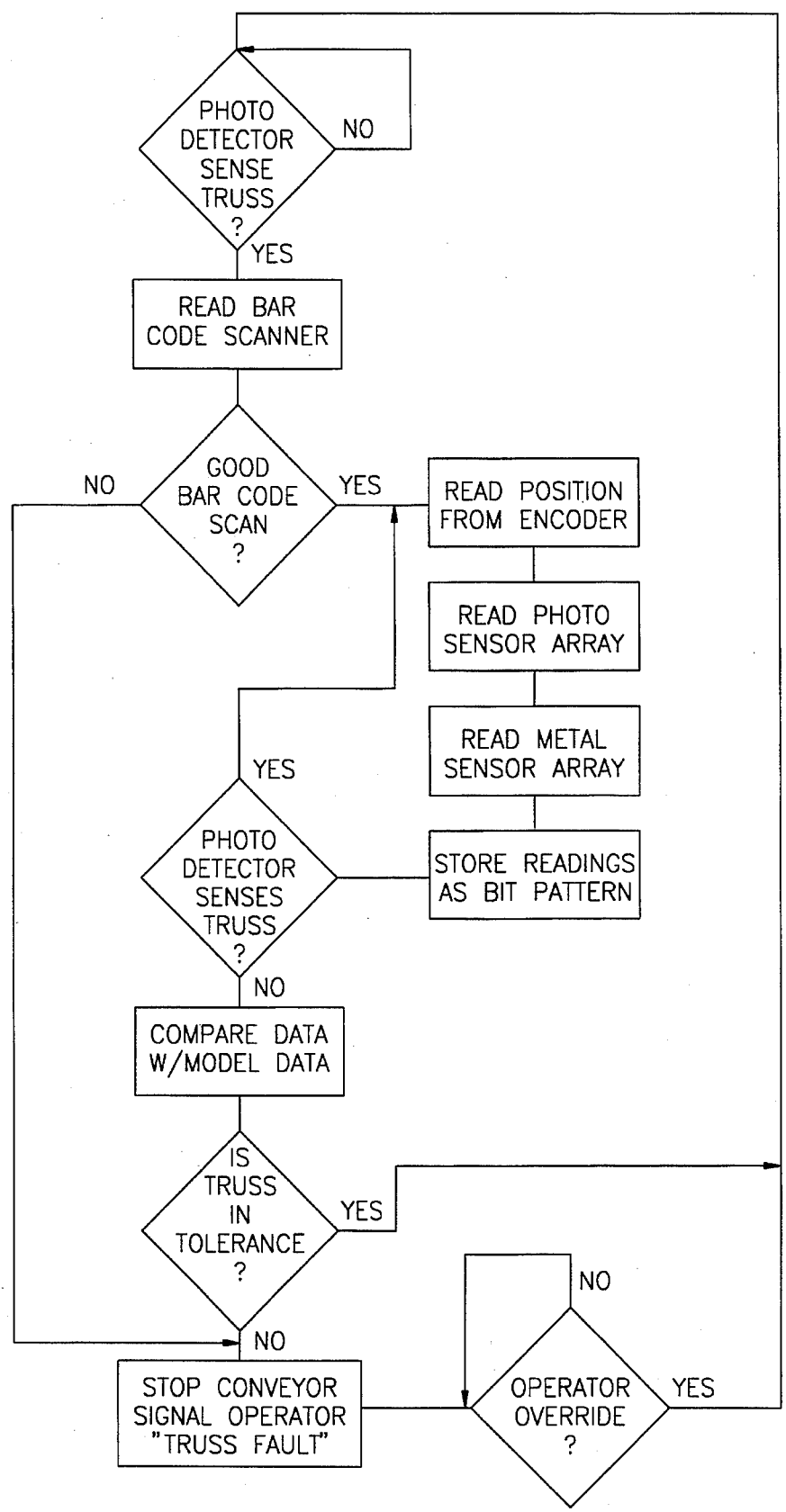
FIG. 4 is a flow chart which diagrams the decision-making process of the present system.

The functioning of the present invention may be best understood by viewing the computer scan routine flowchart shown in FIG. 4, with reference to the top plan views of FIGS. 2 and 3. The computer system 50 polls the truss presence photosensor 38 to determine if a wood truss 100 is about to enter the automated truss inspection system 10. So long as a truss is not entering the system 10, the computer continues to poll the truss presence photosensor 38. As soon as the presence of a truss is registered by the truss presence photosensor 38, the computer 50 polls the bar code scanner 40 which scans the bar code 42 on the truss 100 to determine the model of truss being inspected. If the bar code 42 on the wood truss 100 cannot be read or is flawed, the computer 50 stops the conveyor rollers 36 by disengaging the conveyor drive motor controls 58 (FIG. 5) and activates an alarm horn 60 or the like to signal the operator that the truss 100 being scanned is faulty in some manner.

Once the bar code 42 is read successfully, the rotary pulse generator 48, photosensors 30 and metal detecting proximity switches 22 and 26 are repeatedly polled and the information stored in computer memory as the truss 100 moves past the sensor arrays 20, 24 and 28. Of course, the speed at which the polling is done varies with the speed of the truss 100. For example, at a truss travel speed of 90 feet per minute, and a desired "X" resolution of 1/16th of an inch, approximately 300 scans per second would be needed. The length dimensions of the truss 100 may thus be computed by knowing the truss travel speed and scanner location. The resolution of the "Y" coordinates is determined by the number and spacing of proximity switches 22 and 26 and photosensors 30. As was discussed previously, it is preferred that at least one sensor per inch be used, although providing a greater number and frequency of sensors will result in greater accuracy in determining the position of the various truss elements.

The polling of the various arrays 20, 24 and 28 continues so long as the truss presence photosensor 38 senses the presence of a truss 100. As soon as the truss 100 has passed the detecting area of the truss presence photosensor 38, the photosensor 38 signals the computer system 50 that all data concerning the presently scanned truss 100 has been entered into the computer 50. The computer 50 then collates the received data to construct an X-Y coordinate outline image of the truss under inspection. This is done by analyzing the location of the various wood elements of the truss 100 and the location of the metal nailer plates 200 disclosed by the metal detecting proximity switches 22 and 26 and photosensors 30, in combination with the speed of the truss disclosed by the rotary pulse generator 48. By analyzing the data received from the various arrays 20, 24 and 28 and the rotary pulse generator 48, the X-Y coordinate outline image of the truss 100 under inspection may be constructed.

The resulting outline image can be "moved" to the base line 62 as shown in FIG. 3, by subtracting the shortest distance from the base line 62 to the truss 100 from all truss Y dimensions. Following movement of the truss outline image to the base line 62, angles A and B may be constructed. The measurement for angle A is given by the X axis distance from the front point 68 of the truss 100 to the widest point 70 on the truss 100 and the Y axis distance from the base line 62 to the widest point 70 of the truss, then taking the arctangent of the Y axis distance divided by the X axis distance will give the measurement for angle A. Likewise, taking the X axis distance from front point 68 of truss 100 to end point 72 of truss 100 and the Y axis distance from base line 62 to end point 72 of truss 100, then taking the arctangent of the Y axis distance divided by the X axis distance will result in a measurement for angle B. The difference between angle A and angle B determines the truss pitch which is an important measurement in determining whether truss 100 is within tolerance limits. Other dimensional calculations may be made in a similar manner to that described above in connection with the truss pitch.

Also, the proper placement of the metal nailer plates can be verified by overlaying the X-Y coordinate outline image of the truss 100 under inspection with the metal nailer plate pattern derived from the metal detecting proximity switches 22 and 26. In this manner, missing, misaligned or improperly sized nailer plates may be detected.

If the truss 100 under inspection is found to be defective in any critical characteristic, the computer 50 disengages the conveyor drive motor controls 58 and sounds an alarm horn 60 or the like to notify the operator that the truss 100 under inspection is faulty. At this point, the human operator may either override the stop conveyor signal or remedy the problem with the truss 100 under inspection. In that event, the computer 50 awaits the response by the human operator telling the computer 50 to reengage the conveyor drive motor controls 58 thus forwarding the truss 100 to the finish rollers 44 and 46.

On the other hand, if the truss is found to be within tolerances, the production report file will be updated and the computer readied to scan the next truss. It is preferred that the production report file be a standard inventory file within the computer system 50 for keeping track of the number of trusses made, the type of trusses, number of parts used, lumber sizes, etc. . . . However, it is most important that the computer system 50 be capable of calculating the various measurements and dimensions of the truss 100 under inspection to determine the acceptability of the truss 100.

While the present invention has been described with some degree of particularity, it is to be understood that numerous modifications, additions and substitutions may be made to the structure and elements of the present invention which still fall within the intended broad scope of the appended claims. For example, the size and number of proximity switches 22 and 26 and photosensors 30 may be varied to obtain the desired Y axis resolution. Also, the sensor support structure 12 may be formed integrally with the "finish rollers" such that the entire structure may be installed as a single unit, thus increasing plant start-up efficiency. Also, the exact location and arrangement of elements described above may be modified so long as the utility of the present invention is not damaged.

There has thus been set forth and described an automated truss inspection system which accomplishes at least all of the stated objectives.

I claim:

1. An automated truss inspection system for inspecting metal plate connected trusses comprises;

a base structure having a truss feed end and a truss exit end;

a truss presence detector operatively situated in relation to said base structure for detecting the presence of a truss on said base structure;

a truss structure sensor array operatively situated in relation to said base structure intermediate said truss feed end and said truss exit end for detection of truss structure and absence thereof;

a metal sensor array operatively situated in relation to said base structure intermediate said truss feed end and said truss exit end for detection of presence/absence of metal;

distance measuring means operative to measure the rate of travel of the truss towards said truss exit end;

analyzing and comparing means operatively connected to said truss presence detector, said truss structure sensor array, said metal sensor array and said distance measuring means;

said truss presence detector, said truss structure sensor array, said metal sensor array and said distance measuring means each operative to send data to said analyzing and comparing means;

said analyzing and comparing means including an ideal model of the truss under inspection and being operative to analyze data from said truss presence detector, said truss structure sensor array, said metal sensor array and said distance measuring means to construct an X-Y coordinate outline image of the truss under inspection, and to compare said image to the ideal model of the truss under inspection to determine acceptability of the truss.

2. The automated truss inspection system of claim 1 further comprising scanning means operatively situated in relation to said base structure for scanning the truss to determine the model of truss being inspected.

3. The automated truss inspection system of claim 1 wherein said base structure comprises left and right generally parallel conveyor roller supports which rollably support at least one conveyor roller, said base structure further including a plurality of support members for supporting and mounting said truss presence detector, said truss sensor structure array and said metal sensor array.

4. The automated truss inspection system of claim 1 wherein said truss presence detector comprises a photosensor and reflector assembly mounted generally parallel with said truss structure sensor array such that a truss passing between said photo sensor and said reflector is detected.

5. The automated truss inspection system of claim 2 wherein said scanning means comprises a bar code scanner for detection and reading of a bar code on a wood truss to determine the model of truss being inspected.

6. The automated truss inspection system of claim 1 wherein said truss structure sensor array comprises an array of photo sensors and an array of reflectors, said array of photo sensors mounted on said base structure below said conveyor roller, said array of reflectors mounted above said conveyor roller such that a truss on said conveyor rollers passes between said array of photo sensors and said array of reflectors whereby location of truss elements may be detected by disruption of light flow between said array of photo sensors and said array of reflectors.

7. The automated truss inspection system of claim 6 wherein said at least one metal sensor array comprises two metal sensor arrays, one of said arrays mounted below said at least one conveyor roller, the other of said metal sensor arrays mounted above said at least one conveyor roller such that a wood truss on said conveyor roller passes between said two metal sensor arrays whereby metal plates adjacent either of said metal sensor arrays may be detected.

8. The automated truss inspection system of claim 7 wherein said analyzing and comparing means comprises a computer.

9. The automated truss inspection system of claim 8 wherein said computer receives data on truss element location from said truss structure sensor array and receives data on truss speed from said rotary pulse generator, said computer compiling and processing said received data to generate an X-Y coordinate outline image of the truss under inspection, said computer operative to compare said outline image to the ideal model of the truss under inspection to determine acceptability of the truss under inspection.

10. The automated truss inspection system of claim 9 further comprising stopping means for stopping motion of the truss under inspection and alerting means for alerting an operator that the truss under inspection is not acceptable.

11. The automated truss inspection system of claim 10 wherein said computer is operatively connected to said stopping means and said alerting means such that said computer may engage said stopping means and said alerting means upon determination of the nonacceptability of the truss under inspection.

12. A method for inspecting metal plate connected wood trusses in determining acceptability of the truss under inspection comprises;

providing a base structure having a truss feed end and a truss exit end, a truss presence detector adjacent said truss feed end, scanning means, a truss structure sensor array intermediate said truss feed end and said truss exit end, at least one metal sensor array intermediate said truss feed end and said truss exit end, distance measuring means intermediate said truss feed end and said truss exit end and analyzing and comparing means, said analyzing and comparing means operatively connected to said truss presence detector, said scanning means, said truss structure sensor array, said metal sensor array and said distance measuring means;

feeding a metal plate connected truss onto said base structure at said truss feed end;

moving the truss towards said truss exit end of said base structure at a generally constant rate of speed;

registering the presence of the truss on said base structure through said truss presence detector;

scanning the truss and determining the model of truss under inspection through said scanning means;

polling said truss structure sensor array, said at least one metal sensor array and said distance measuring means through said analyzing and comparing means to determine the location and dimensions of truss structures, metal plates and truss speed on said base structure;

registering the end of the truss through said truss presence detector and stopping polling of said truss structure sensor array, said at least one metal sensor array and said distance measuring means is stopped;

analyzing and collating the location and position data received from said truss structure array, said at least one metal sensor array and said distance measuring means through said analyzing and comparing means;

constructing an X-Y coordinate outline image of the truss under inspection through said analyzing and comparing means;

comparing said constructed X-Y coordinate outline image of the truss under inspection to an ideal model of the truss under inspection to determine acceptability of the truss under inspection; and determining the acceptability of the truss under inspection through said analyzing and comparing means.

* * * * *